(12) United States Patent
Roy Chowdhury et al.

(10) Patent No.: US 11,062,455 B2
(45) Date of Patent: Jul. 13, 2021

(54) DATA FILTERING OF IMAGE STACKS AND VIDEO STREAMS

(71) Applicant: Volvo Car Corporation, Gothenburg (SE)

(72) Inventors: Sohini Roy Chowdhury, Santa Clara, CA (US); Megha Maheshwari, Sunnyvale, CA (US)

(73) Assignee: Volvo Car Corporation, Göteborg (SE)

( * ) Notice: Subject to any disclaimer, the term of this patent is extended or adjusted under 35 U.S.C. 154(b) by 118 days.

(21) Appl. No.: 16/589,418

(22) Filed: Oct. 1, 2019

(65) Prior Publication Data
US 2021/0097692 A1   Apr. 1, 2021

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00744* (2013.01); *G06K 9/4671* (2013.01); *G06K 9/6202* (2013.01); *G06K 9/6256* (2013.01)

(58) Field of Classification Search
CPC ...... G06T 7/11; G06K 9/6202; G06K 9/6256; G06K 9/4671; G06K 9/00744
See application file for complete search history.

(56) References Cited

U.S. PATENT DOCUMENTS 6,389,168 B2 *   5/2002   Altunbasak ........ G06K 9/00711
                                                                382/224
6,549,643 B1 *   4/2003   Toklu ................. G06K 9/00751
                                                                382/107
(Continued)

FOREIGN PATENT DOCUMENTS

| CN | 108053025 A | 5/2018 |
|---|---|---|
| CN | 109862391 A | 6/2019 |
| WO | 2018104563 A2 | 6/2018 |

OTHER PUBLICATIONS

Kulhare et al., Key Frame Extraction for Salient Activity Recognition, 2016 23rd International Conference on Pattern Recognition (ICPR), Cancún Center, Cancún, México, Dec. 4-8, 2016, pp. 830-835.

*Primary Examiner* — Aaron W Carter
(74) *Attorney, Agent, or Firm* — Clements Bernard Walker; Christopher L. Bernard

(57) ABSTRACT

Filtering a data set including a plurality of image frames to form a reduced "key frame" data set including a reduced plurality of "key" image frames that is suitable for use in training an artificial intelligence (AI) or machine learning (ML) system, including: removing an image frame from the plurality of image frames of the data set if a structural similarity metric of the image frame with respect to another image frame exceeds a predetermined threshold, thereby forming a reduced data set including a reduced plurality of image frames; and analyzing an object/semantic content of each of the reduced plurality of images using a plurality of dissimilar expert models and designating any image frames for which the plurality of expert models disagree related to the object/semantic content as "key" image frames, thereby forming the reduced "key frame" data set including the reduced plurality of "key" image frames.

20 Claims, 9 Drawing Sheets

(51) Int. Cl.
 *G06K 9/62* (2006.01)
 *G06K 9/46* (2006.01)

(56) References Cited

U.S. PATENT DOCUMENTS

| | | | | |
|---|---|---|---|---|
| 7,760,956 | B2 * | 7/2010 | Lin | G06K 9/00711 |
| | | | | 382/254 |
| 8,571,330 | B2 * | 10/2013 | Gao | G06F 16/70 |
| | | | | 382/224 |
| 10,459,975 | B1 * | 10/2019 | Malpani | G06F 16/71 |
| 2005/0228849 | A1 | 10/2005 | Zhang | |
| 2018/0174600 | A1 * | 6/2018 | Chaudhuri | H04N 21/4666 |
| 2020/0134321 | A1 * | 4/2020 | Chen | G06K 9/00771 |
| 2020/0304802 | A1 * | 9/2020 | Habibian | G06K 9/6271 |
| 2020/0357444 | A1 * | 11/2020 | Qin | G11B 27/031 |
| 2020/0380263 | A1 * | 12/2020 | Yang | G06K 9/629 |

\* cited by examiner

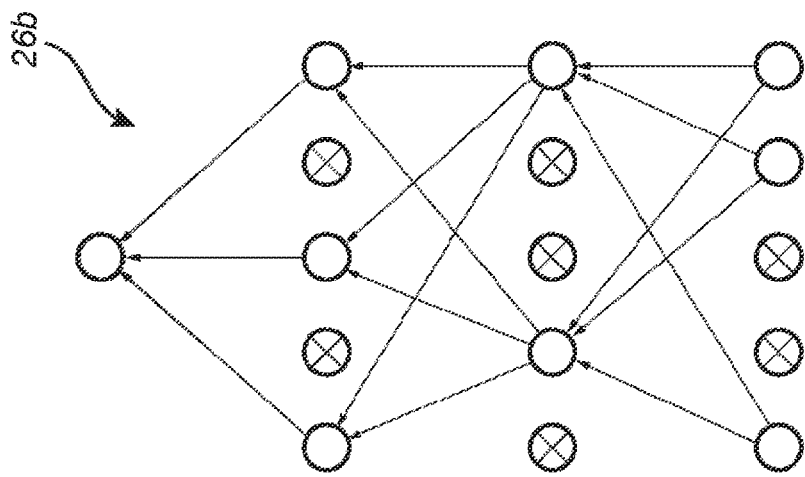
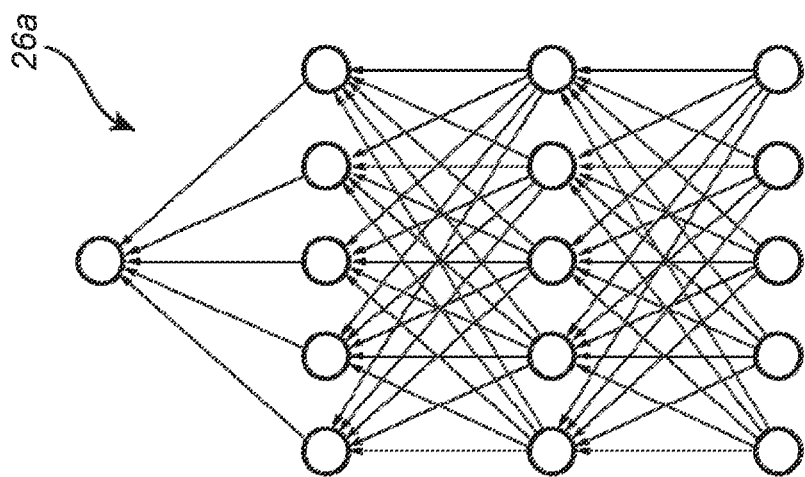
Fig. 5

DATA FILTERING OF IMAGE STACKS AND VIDEO STREAMS

TECHNICAL FIELD

The present disclosure relates generally to the automotive, artificial intelligence (AI) and machine learning (ML), and advanced driver assistance systems (ADAS) and autonomous driving (AD) fields. More particularly, the present disclosure relates to the data filtering of image stacks and video streams used to train AI and ML systems in vehicles, including ADAS and AD systems.

BACKGROUND

ADAS and AD systems in vehicles, and AI and ML systems in general, require annotated image data to train functionalities, such as object detection, lane detection, and drivable surface semantic segmentation. This poses two main problems. First, "key frames" that represent learnable instances must be identified individually, which can be time consuming, subjective, and prone to "hand waiving" when done manually. Second, the selection of a manageable number of "key frames" that encompass limiting conditions to be learned is challenging as it lacks generalizability across collective image sequences.

Thus, what is needed is an automated process that is capable of identifying "key frames" from a large image stack or long video sequence, and identifying frames that are significantly dissimilar from one another such that they represent a variety of learnable instances. Preferably, this automated process can be benchmarked, saves manual curation time, and can be modified based on given annotation specifications. What is also needed is an automated process that utilizes an active learning framework in which a multi-expert system is invoked to identify a subset of images where the multiple experts vary in their detection/segmentation tasks, such that the automated process can identify up to 5% of image frames that actually represent limiting conditions with respect to object and semantic segmentation tasks.

"Key frames" in an image stack or video sequence are defined as the representative frames that provide the most accurate and compact summary of and critical exceptions regarding the associated content, such as vehicles, lane lines, the drivable surface, etc. Most existing "key frame" extraction techniques start with the decomposition of a video sequence, for example, into temporal segments (i.e., time-interleaved images/shots or scenes) and then extract a fixed or not-fixed number of "key frames" per temporal segment. In some applications, even the selection of the middle frame of each shot or scene may be one approach for "key frame" estimation. The middle frame is selected, as opposed to the first frame or the last frame, to weed out artistic passages connecting one shot or scene to another, such as visual effects like fade-in/fade-out at the beginning or end of a shot or scene.

Another widely used, but problematic, approach is to use low-level visual information for all video frames (or all shot frames or all scene frames) to group them using e.g. k-means and then to select as "key frames" the ones that are most similar to the group centers of the groups.

A further widely used, but problematic, approach employs a sequential search to a video stream. Such techniques start with a "root key frame" (usually randomly selected as one of the first frames of the video stream) and then compare one-by-one the next frames until a frame with significantly different low-level visual content is found. This then becomes the new "root key frame" and the process continues.

Active learning methods involving uncertainty sampling require the identification of a small subset of data points that represent limiting conditions, however, no such methods have been proposed for use with image stacks or video sequences to date.

SUMMARY

The present disclosure provides an automated process that is capable of identifying "key frames" from a large image stack or video sequence, and identifying frames that are significantly dissimilar from one another such that they represent a variety of learnable instances. This automated process can be benchmarked, saves manual curation time, and can be modified based on given annotation specifications. The present disclosure also provides an automated process that utilizes an active learning framework in which a multi-expert system is invoked to identify a subset of images where the multiple well-trained expert models vary significantly in their detection/segmentation capabilities, such that the automated process can identify up to 5% of image frames that actually represent limiting conditions with respect to object and semantic segmentation tasks.

In one exemplary embodiment, the present disclosure provides a method of filtering a data set including a plurality of image frames from an image stack or a video sequence to form a reduced "key frame" data set including a reduced plurality of "key" image frames that is suitable for use in training an artificial intelligence (AI) or machine learning (ML) system, the method including: using a filtering stage, removing an image frame from the plurality of image frames from the video sequence if a structural similarity metric of the image frame with respect to a sequence of previous frames exceeds a predetermined threshold, thereby forming a reduced data set including a reduced plurality of image frames; and, using a subsequent filtering stage, analyzing the content of each of the reduced plurality of images using a plurality of dissimilar expert models and designating any image frames for which the plurality of expert models disagree related to the content beyond a predetermined threshold as "key" image frames, thereby forming the reduced "key frame" data set including the reduced plurality of "key" image frames. Optionally, the method further includes quantifying a degree to which the plurality of expert systems or trained machine learning/deep learning models disagree related to the position of objects, such as cars, pedestrians, road surface, etc. in each of the designated "key" image frames. Optionally, the method further includes annotating each of the reduced plurality of "key" image frames of the reduced "key frame" data set. The structural similarity metric includes one of a Structural Similarity Index Metric (SSIM), a scale invariant feature transform (SIFT) metric, a speeded up robust feature (SURF), a histogram of oriented gaussians (HoG), or gradient information with scales and orientation (GIST). The plurality of dissimilar expert models include a convolutional neural network or any trained machine learning model for detecting the location of objects, such as cars, pedestrians, or regions of interest, such as road surface, buildings, foliage, etc. The structural similarity metric of the image frame with respect to the another image frame exceeds the predetermined threshold if the structural content (i.e., pixel content and position of structures) in the image frame and the another image frame is sufficiently similar. Accordingly, the plurality of expert models disagree related to the content of each of the reduced plurality of image frames beyond the predetermined threshold if object detections/region segmentations performed by each of the plurality of the expert models are sufficiently different.

In another exemplary embodiment, the present disclosure provides a non-transitory computer readable medium stored in a memory and executed by a processor to perform steps to filter a data set including a plurality of image frames from an image stack or a video sequence to form a reduced "key frame" data set including a reduced plurality of "key" image frames that is suitable for use in training an artificial intelligence (AI) or machine learning (ML) system, the steps including: using a filtering stage, removing an image frame from the plurality of image frames from the video sequence if a structural similarity metric of the image frame with respect to a sequence of previous frames exceeds a predetermined threshold, thereby forming a reduced data set including a reduced plurality of image frames; and, using a subsequent filtering stage, analyzing the content of each of the reduced plurality of images using a plurality of dissimilar expert models and designating any image frames for which the plurality of expert models disagree related to the content beyond a certain amount as "key" image frames, thereby forming the reduced "key frame" data set including the reduced plurality of "key" image frames. Optionally, the steps further include quantifying a degree to which the plurality of expert models disagree related to the content of each of the designated "key" image frames. Optionally, the steps further include annotating each of the reduced plurality of "key" image frames of the reduced "key frame" data set. The structural similarity metric includes one of a Structural Similarity Index Metric (SSIM), a scale invariant feature transform (SIFT) metric, a speeded up robust feature (SURF), a histogram of oriented gaussians (HoG), or gradient information with scales and orientation (GIST). The plurality of dissimilar expert models include a convolutional neural network or any trained machine learning model for detecting the location of objects, such as cars, pedestrians, or regions of interest, such as road surface, buildings, foliage, etc. The structural similarity metric of the image frame with respect to the another image frame exceeds the predetermined threshold if the structural content (i.e., pixel content and position of structures) in the image frame and the another image frame is sufficiently similar. Accordingly, the plurality of expert models disagree related to the content of each of the reduced plurality of image frames beyond the predetermined threshold if object detections/region segmentations performed by each of the plurality of the expert models are sufficiently different.

In a further exemplary embodiment, the present disclosure provides a system for filtering a data set including a plurality of image frames from an image stack or a video sequence to form a reduced "key frame" data set including a reduced plurality of "key" image frames that is suitable for use in training an artificial intelligence (AI) or machine learning (ML) system, the system including: a filtering stage operable for removing an image frame from the plurality of image frames from the video sequence if a structural similarity metric of the image frame with respect to a sequence of previous frames exceeds a predetermined threshold, thereby forming a reduced data set including a reduced plurality of image frames; and a subsequent filtering stage operable for analyzing the content of each of the reduced plurality of images using a plurality of dissimilar expert models and designating any image frames for which the plurality of expert models disagree related to the content beyond a certain amount as "key" image frames, thereby forming the reduced "key frame" data set including the reduced plurality of "key" image frames. Optionally, the subsequent filtering stage is further operable for quantifying a degree to which the plurality of expert systems or trained machine learning/deep learning models disagree related to the position of objects, such as cars, pedestrians, road surface, etc. in each of the designated "key" image frames. The structural similarity metric includes one of a Structural Similarity Index Metric (SSIM), a scale invariant feature transform (SIFT) metric, a speeded up robust feature (SURF), a histogram of oriented gaussians (HoG), or gradient information with scales and orientation (GIST). The plurality of dissimilar expert models include a convolutional neural network or any trained machine learning model for detecting the location of objects, such as cars, pedestrians, or regions of interest, such as road surface, buildings, foliage, etc. The structural similarity metric of the image frame with respect to the another image frame exceeds the predetermined threshold if the structural content (i.e., pixel content and position of structures) in the image frame and the another image frame is sufficiently similar. Accordingly, the plurality of expert models disagree related to the content of each of the reduced plurality of image frames beyond the predetermined threshold if object detections/region segmentations performed by each of the plurality of the expert models are sufficiently different.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a schematic diagram illustrating one exemplary embodiment of the multi-expert system utilized by the data filtering scheme of the present disclosure;

DESCRIPTION OF EMBODIMENTS

The present disclosure provides an automated process that is capable of identifying "key frames" from a large image stack or video sequence, and identifying frames that are significantly dissimilar from one another such that they represent a variety of learnable instances. This automated process can be benchmarked, saves manual curation time, and can be modified based on given annotation specifications. The present disclosure also provides an automated process that utilizes an active learning framework in which a multi-expert system is invoked to identify a subset of images where the multiple experts vary in their detection/segmentation tasks, such that the automated process can identify up to 5% of image frames that actually represent limiting conditions with respect to object and semantic segmentation tasks.

Figure 1:
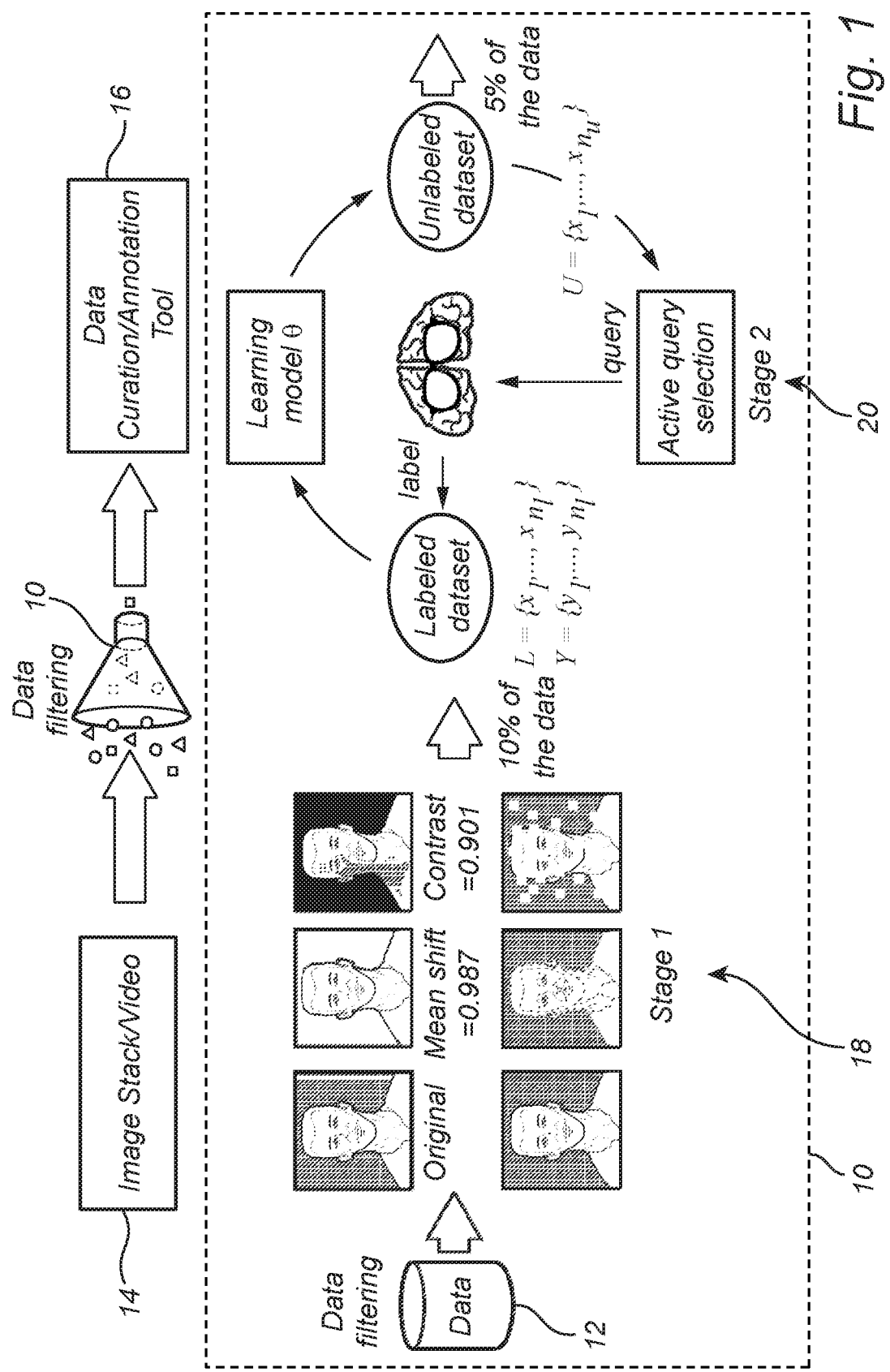
FIG. 1 is a schematic diagram illustrating one exemplary embodiment of the data filtering scheme of the present disclosure.

Referring now specifically to FIG. 1, in general, the data filtering scheme 10 of the present disclosure is used to reduce the data 12 associated with an image stack or video stream 14 to a manageable size (e.g., 10% or 5% of its original size). This reduced data set is then used to train a data curation/annotation tool 16, as is done conventionally. The data 12 is reduced by about 90% by a first processing stage 18, and by about 95% by a second processing stage 20, as is described in greater detail herein below. In this manner, a manageable training data set is efficiently created, while being representative to variations in the data 12 as a whole, such that effective AI/ML training can be carried out.

Figure 2:
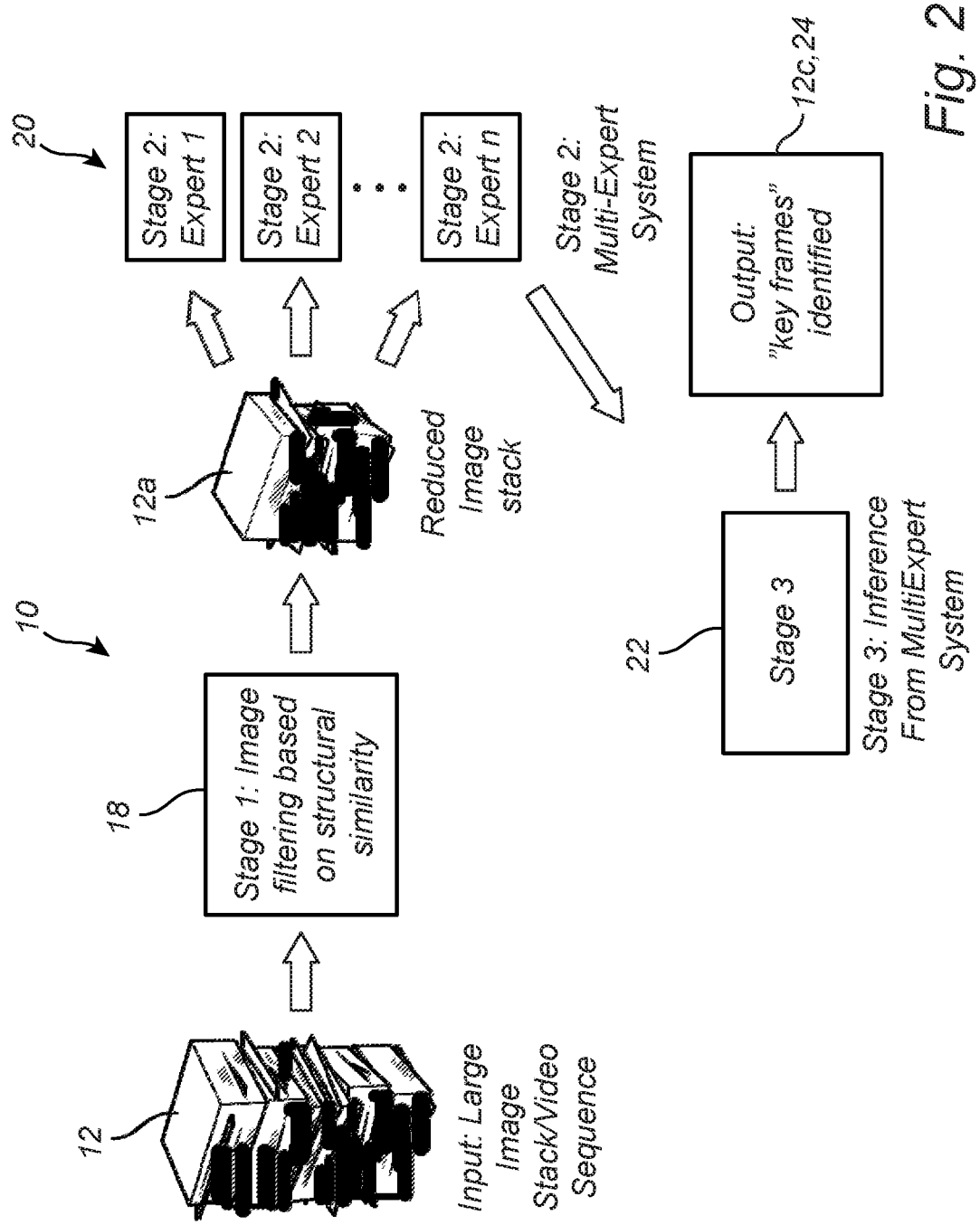
FIG. 2 is another schematic diagram illustrating one exemplary embodiment of the data filtering scheme of the present disclosure.

Referring now specifically to FIG. 2, in one exemplary embodiment, the data filtering scheme 10 includes an input consisting of a large image stack or video sequence 12 that is fed to a first processing stage 18 that filters the data based on structural similarities to provide a reduced data set 12a that is approximately 10% of the original data set 12. This reduced data set 12a is then fed to a second processing stage 20 that utilizes a multi-expert system consisting of a plurality of expert mechanisms for further identifying structural similarities and filtering the reduced data set 12a on this basis. Here, the expert mechanisms may agree or disagree, so a third processing stage 22 is utilized to analyze agreement/disagreement among the expert mechanisms and rectify the same. In this manner, "key frames" 24 are identified and outputted, providing a final, condensed data set 12c that represents approximately 5% of the original data set 12, for example, while still being suitable for fully training the AWL algorithm.

In stage 1 18, the images 12 are inputted and, for every pair of images, structural similarities are compared using a metric, such as a structural similarity index metric (SSIM). Other exemplary metrics that may be used include, but are not limited to, Structural Similarity Index Metrics (SSIM), scale invariant feature transform (SIFT) metrics, speeded up robust features (SURF), histograms of oriented gaussians (HoG), or gradient information with scales and orientation (GIST). If the score between two images is 1, this means that the images are completely similar, for example. A score of 0 means that two images are completely dissimilar, for example. A score between 0 and 1 means that two images can have varying degrees of similarity. A SSIM metric threshold is therefore chosen, for example 0.7. If the score between two images is greater than 0.7, then both images contain similar structural information and either of the two images may be chosen to represent the annotation image subset, otherwise both images must be chosen to represent all structural variations for the annotation image subset. In this manner, substantially duplicative images are removed from the data set 12 to form a reduced data set 12a.

In stage 2 20, multiple trained automated expert are utilized, such as a convolutional neural network (CNN) that has been pre-trained using a similar data set. In one exemplary embodiment, a CNN model trained for object detection is utilized with variabilities introduced by dropout masks in the final layer, such that multiple versions of the network model implement certain nodes to be randomly removed each time, to obtain variable object detection outcomes from similarly trained expert systems. The same images 12 are passed to all experts such that individual outputs are provided under varied circumstances. Here, any ML algorithm can be varied and used, such as, but not limited to, recurrent neural networks, echo state networks, or multi-stage deep learning networks with dropout masks.

In stage 3 22, the outputs from the automated experts of stage 2 20 are combined and compared using an intersection over union metric, for example. If all experts agree regarding the positions of regions of interest (e.g., object bounding boxes or semantic regions), then the image is deemed to be structurally simple and is not a "key frame" 24. If the experts vary significantly in their analyses, then the image is classified as a "key frame" and is used in the final data set 12c.

Figure 3:
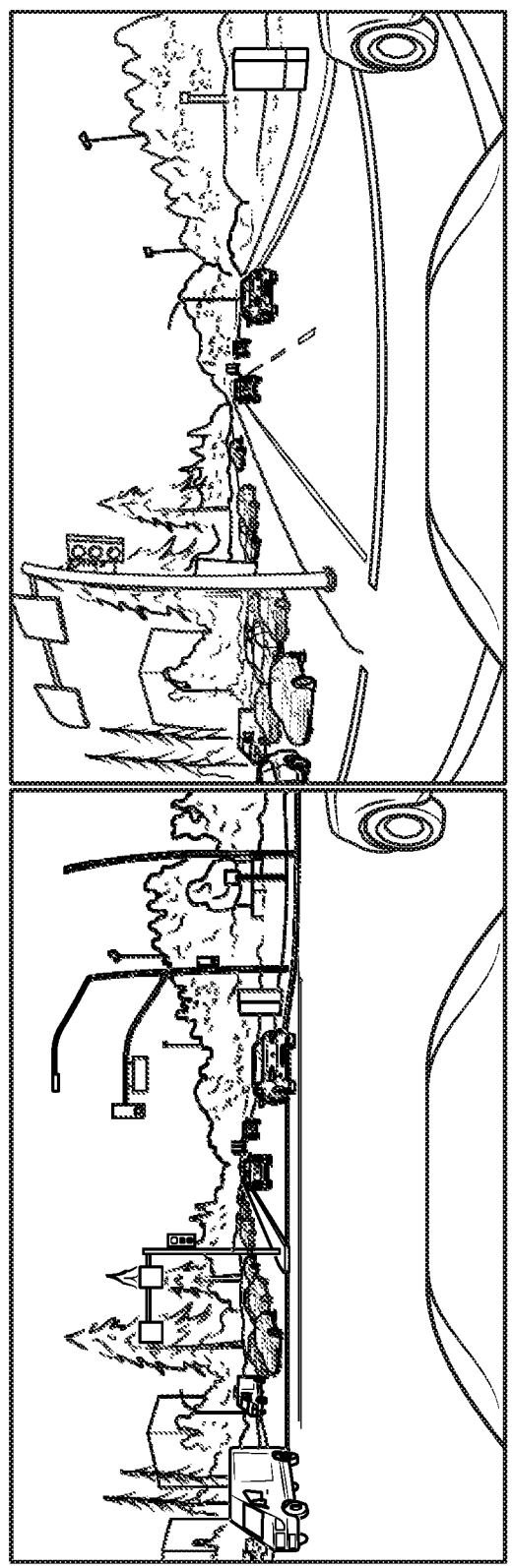
FIG. 3 is a series of images that are similar in structure, such that they may be condensed in the ultimate training data set of the present disclosure.

FIG. 3 is a series of images that are similar in structure, such that they may be condensed in the ultimate training data set of the present disclosure. Their SSIM is greater than 0.7 based on the relative pixel positions in the images in terms of objects, clusters, occlusions, etc. Thus, only one image is needed in the reduced data set 12b,12c.

Figure 4:
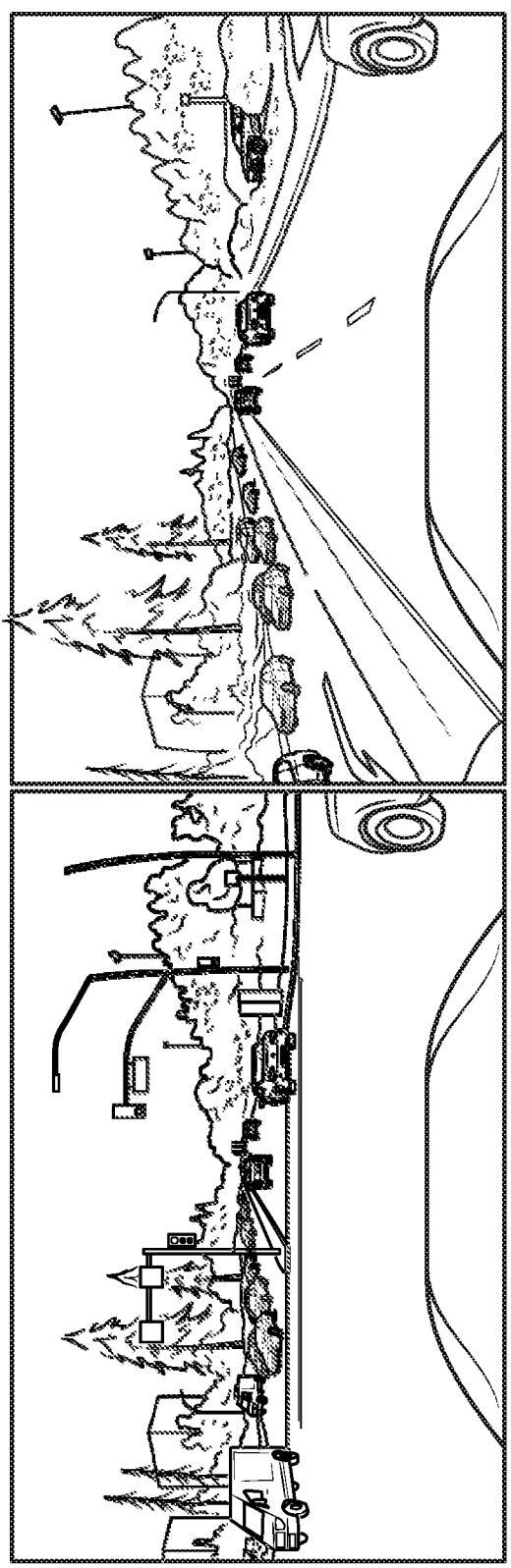
FIG. 4 is a series of images that are not similar in structure, such that they may not be condensed in the ultimate training data set of the present disclosure.

FIG. 4 is a series of images that are not similar in structure, such that they may not be condensed in the ultimate training data set of the present disclosure. Their SSIM is less than 0.7 based on the relative pixel positions in the images in terms of objects, clusters, occlusions, etc. Thus, both images are needed in the reduced data set 12b,12c.

FIG. 5 is a schematic diagram illustrating one exemplary embodiment of the multi-expert system 20 utilized by the data filtering scheme 10 of the present disclosure. Specifically, a CNN is shown with all neurons or nodes working to contribute to the output, and with some modes deactivated so that they do not contribute to the output. By randomizing this deactivation, a multi-expert system can effectively be created. Note, as illustrated, crossed nodes do not contribute to the output, and all connections to and from crossed nodes are absent.

Figure 6:
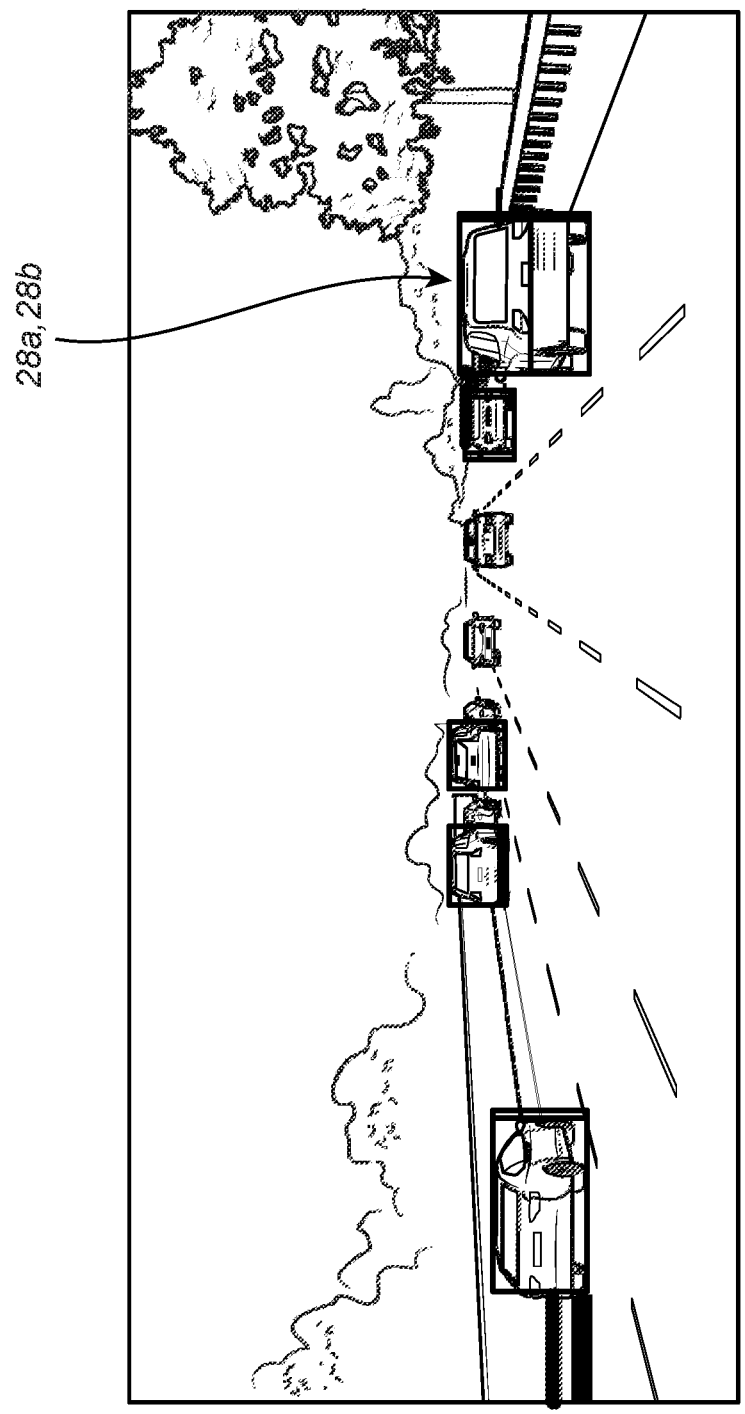
FIG. 6 is an image illustrating the agreement/disagreement of different expert mechanisms in accordance with the data filtering scheme of the present disclosure.

FIG. 6 is an image illustrating the agreement/disagreement of different expert mechanisms in accordance with data filtering scheme 10 of the present disclosure. As illustrated, the boxes 28a,28b associated with the vehicle to the right of the image are in disagreement due to the vehicle being partially obscured by shadows. Other boxes in the image are in substantial agreement. Thus, this is a "key frame" that requires annotation and should be used as part of the final reduced data set 12c.

Figure 7:
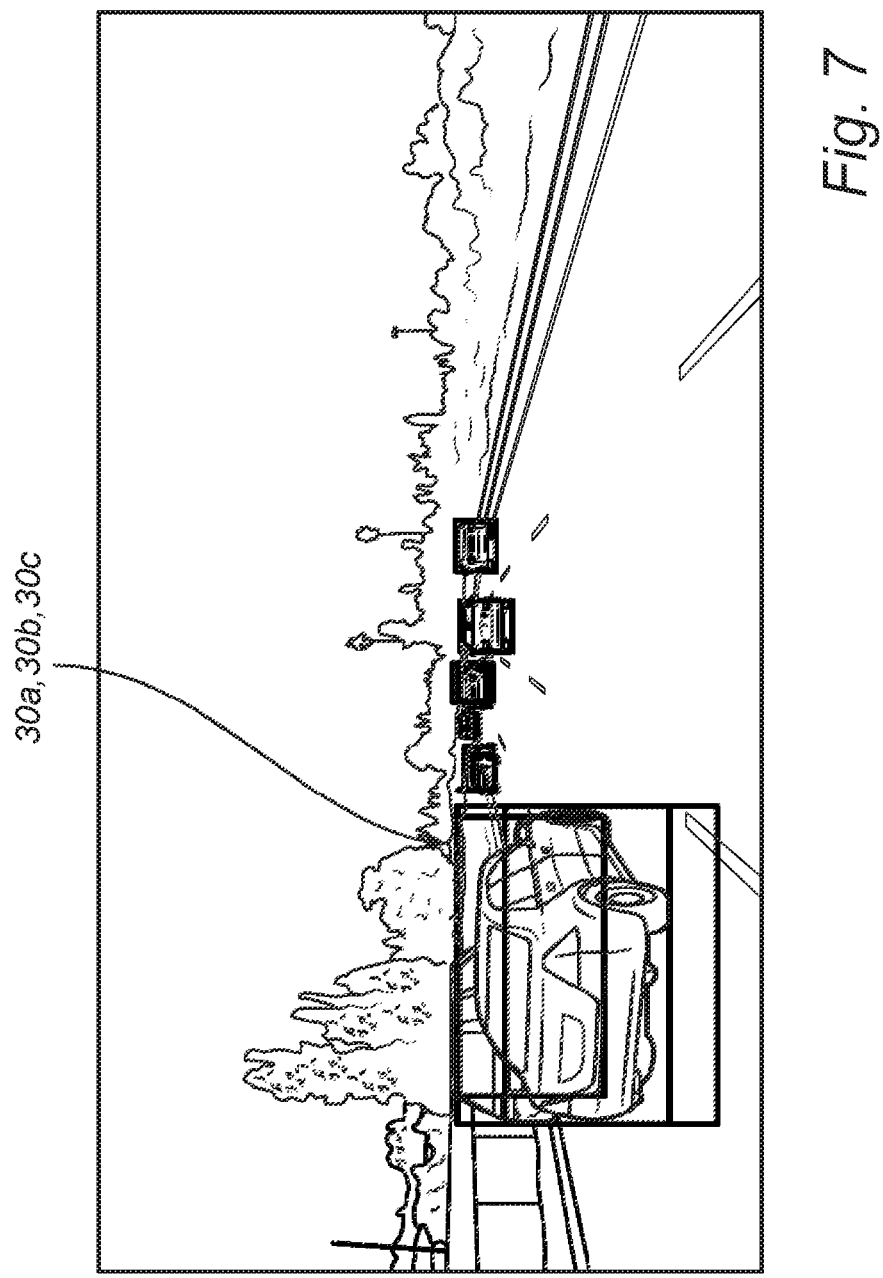
FIG. 7 is another image illustrating the agreement/disagreement of different expert mechanisms in accordance with the data filtering scheme of the present disclosure.

FIG. 7 is another image illustrating the agreement/disagreement of different expert mechanisms in accordance with the data filtering scheme 10 of the present disclosure. As illustrated, the boxes 30a,30b,30c associated with the vehicle to the left of the image are in disagreement due to the vehicle being partially obscured by low-standing sun. Other boxes in the image are in substantial agreement. Thus, this is a "key frame" that requires annotation and should be used as part of the final reduced data set 12c.

Figure 8:
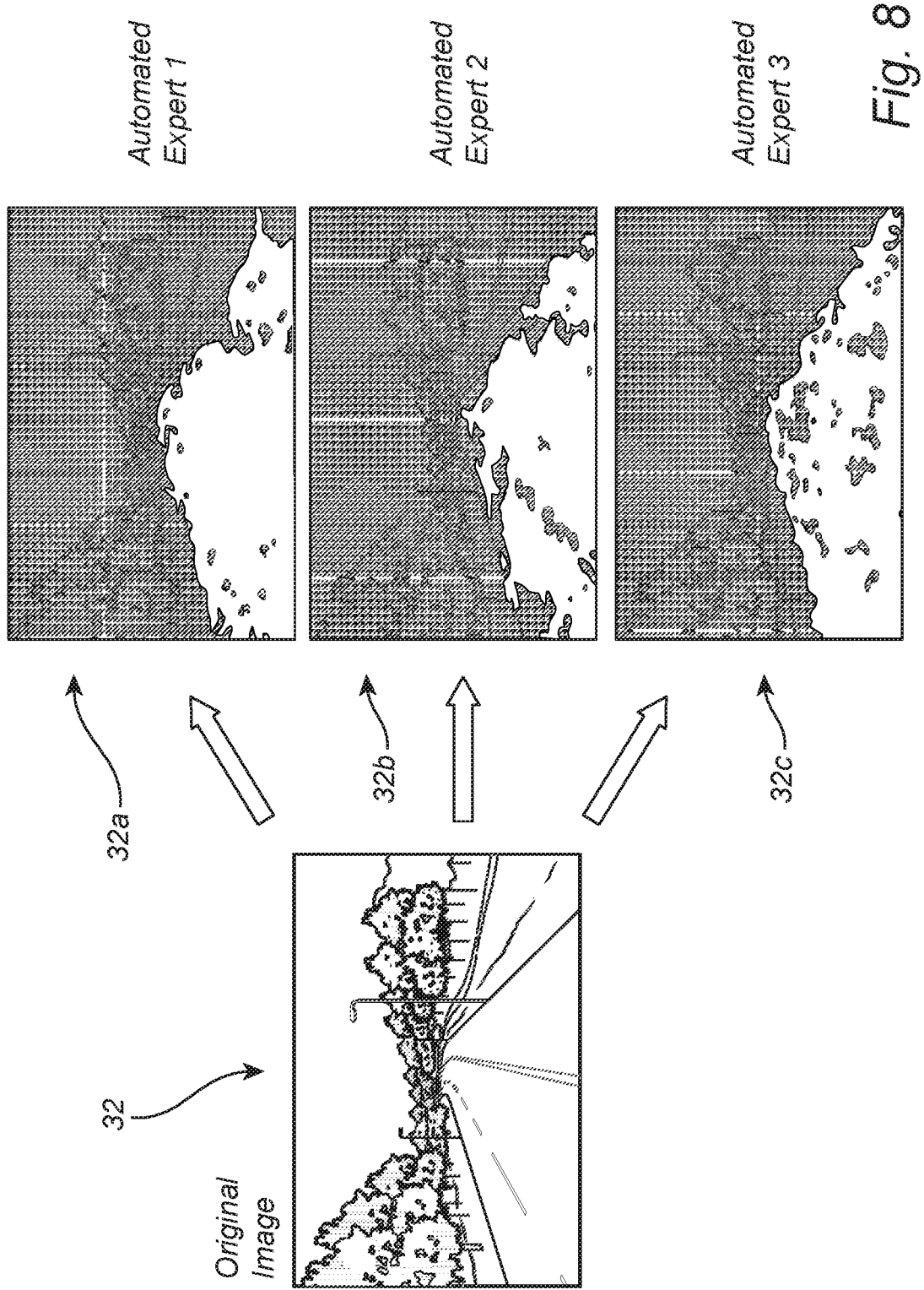
FIG. 8 is a further series of images illustrating the agreement/disagreement of different expert mechanisms in accordance with the data filtering scheme of the present disclosure.

FIG. 8 is a further series of images illustrating the agreement/disagreement of different expert mechanisms in accordance with the data filtering scheme 10 of the present disclosure. Here, the original image 32 is interpreted by three automated experts, creating three automated expert images 32a,32b,32c, with the region of interest being the road surface. All three automated experts are in substantial agreement, with a large intersection between the road surfaces of all three images. Thus, the image 32 is not a "key frame" and can be eliminated from the final reduced data set 12*c*.

Figure 9:
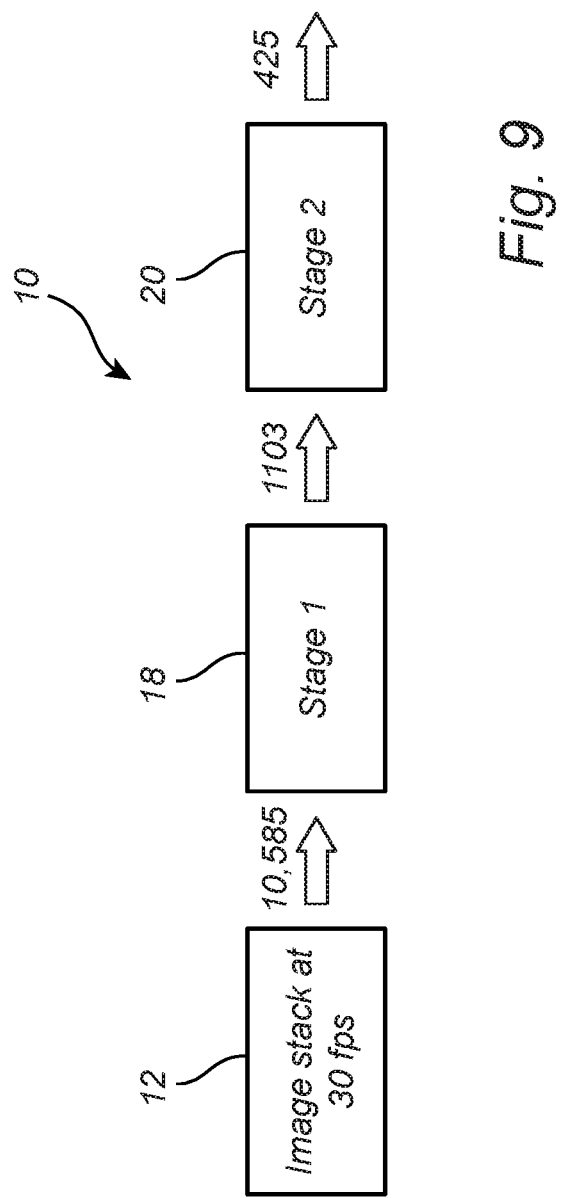
FIG. 9 is a further schematic diagram illustrating one exemplary embodiment of the data filtering scheme of the present disclosure.

FIG. 9 is a further schematic diagram illustrating one exemplary embodiment of the data filtering scheme of the present disclosure. Here the input image stack 12, consisting of images gathered at 30 frames per second, includes 10,585 images, while stage 1 18 filters the data to 1,103 images, and stage 2 20 further filters the data to 425 images. It should be noted that the methods and systems of the present disclosure may also be used to rank the images of the resulting image set 24 based on the degree to which each constitutes a "key frame," with dissimilar and disagreement-inducing images being the most important for training purposes.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure provides an automated process that is capable of identifying "key frames" from a large image stack or long video sequence, and identifying frames that are significantly dissimilar from one another such that they represent a variety of learnable instances for AL/ML and/or training purposes. This automated process can be benchmarked, saves manual curation time, and can be modified based on given annotation specifications. The present disclosure also provides an automated process that utilizes an active learning framework in which a multi-expert system is invoked to identify a subset of images where the multiple experts vary in their detection/segmentation tasks, such that the automated process can identify up to 5% of image frames that actually represent limiting conditions with respect to object and semantic segmentation tasks.

The present disclosure provides an automated multi-expert system that can be used to identify a small subset of "key frames" from a stack of potential training data. Structural patterns in the images are leveraged and the multiple experts are used to explore objects and semantics. This allows for simplified curation and rapid "key frame" detection, enabling subsequent annotation of the identified frames, either on a manual or automated basis. The benefit of the present disclosure is the reduction in time for annotation of frames, resulting in savings with respect to labor cost and time.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method of filtering a data set comprising a plurality of image frames from an image stack or a video sequence to form a reduced "key frame" data set comprising a reduced plurality of "key" image frames that is suitable for use in training an artificial intelligence (AI) or machine learning (ML) system, the method comprising;
   using a filtering stage, removing an image frame from the plurality of image frames of the data set if a structural similarity metric of the image frame with respect to another image frame exceeds a predetermined threshold, thereby forming a reduced data set comprising a reduced plurality of image frames; and
   using a subsequent filtering stage, analyzing an object/semantic content of each of the reduced plurality of images using a plurality of dissimilar expert models and designating any image frames for which the plurality of expert models disagree related to the object/semantic content as "key" image frames, thereby forming the reduced "key frame" data set comprising the reduced plurality of "key" image frames.

2. The method of claim 1, further comprising quantifying a degree to which the plurality of expert models disagree related to the object/semantic content of each of the designated "key" image frames.

3. The method of claim 1, further comprising annotating each of the reduced plurality of "key" image frames of the reduced "key frame" data set.

4. The method of claim 1, wherein the structural similarity metric comprises one of a Structural Similarity Index Metric, a scale invariant feature transform (SIFT) metric, a speeded up robust feature (SURF), a histogram of oriented gaussians (HoG), and gradient information with scales and orientation (GIST).

5. The method of claim 1, wherein the plurality of dissimilar expert models comprise a convolutional neural network with variable dropout mask configurations, such that nodes can be randomly removed in successive iterations to obtain variable object detection/region segmentation outcomes from similarly trained expert systems.

6. The method of claim 1, wherein the structural similarity metric of the image frame with respect to the another image frame exceeds the predetermined threshold if the pixel content and position of the image frame and the another image frame is sufficiently similar.

7. The method of claim 1, wherein the plurality of expert models disagree related to the object/semantic content of each of the reduced plurality of image frames if segmentations performed by each of the plurality of dissimilar expert models are sufficiently different.

8. A non-transitory computer readable medium stored in a memory and executed by a processor to perform steps to filter a data set comprising a plurality of image frames from an image stack or a video sequence to form a reduced "key frame" data set comprising a reduced plurality of "key" image frames that is suitable for use in training an artificial intelligence (AI) or machine learning (ML) system, the steps comprising;
   using a filtering stage, removing an image frame from the plurality of image frames of the data set if a structural similarity metric of the image frame with respect to another image frame exceeds a predetermined threshold, thereby forming a reduced data set comprising a reduced plurality of image frames; and
   using a subsequent filtering stage, analyzing an object/semantic content of each of the reduced plurality of images using a plurality of dissimilar expert models and designating any image frames for which the plurality of expert models disagree related to the object/semantic content as "key" image frames, thereby forming the reduced "key frame" data set comprising the reduced plurality of "key" image frames.

9. The non-transitory computer-readable medium of claim 8, wherein the steps further comprise quantifying a degree to which the plurality of expert models disagree related to the object/semantic content of each of the designated "key" image frames.

10. The non-transitory computer-readable medium of claim 8, wherein the steps further comprise annotating each of the reduced plurality of "key" image frames of the reduced "key frame" data set.

11. The non-transitory computer-readable medium of claim 8, wherein the structural similarity metric comprises one of a Structural Similarity Index Metric, a scale invariant feature transform (SIFT) metric, a speeded up robust feature (SURF), a histogram of oriented gaussians (HoG), and gradient information with scales and orientation (GIST).

12. The non-transitory computer-readable medium of claim 8, wherein the plurality of dissimilar expert models comprise a convolutional neural network with variable dropout mask configurations, such that nodes can be randomly removed in successive iterations to obtain variable object detection/region segmentation outcomes from similarly trained expert systems.

13. The non-transitory computer-readable medium of claim 8, wherein the structural similarity metric of the image frame with respect to the another image frame exceeds the predetermined threshold if the pixel content and position of the image frame and the another image frame is sufficiently similar.

14. The non-transitory computer-readable medium of claim 8, wherein the plurality of expert models disagree related to the object/semantic content of each of the reduced plurality of image frames if segmentations performed by each of the plurality of dissimilar expert models are sufficiently different.

15. A system for filtering a data set comprising a plurality of image frames from an image stack or a video sequence to form a reduced "key frame" data set comprising a reduced plurality of "key" image frames that is suitable for use in training an artificial intelligence (AI) or machine learning (ML) system, the system comprising;
   a filtering stage operable for removing an image frame from the plurality of image frames of the data set if a structural similarity metric of the image frame with respect to another image frame exceeds a predetermined threshold, thereby forming a reduced data set comprising a reduced plurality of image frames; and
   a subsequent filtering stage operable for analyzing an object/semantic content of each of the reduced plurality of images using a plurality of dissimilar expert models and designating any image frames for which the plurality of expert models disagree related to the object/semantic content as "key" image frames, thereby forming the reduced "key frame" data set comprising the reduced plurality of "key" image frames.

16. The system of claim 15, wherein the subsequent filtering stage is further operable for quantifying a degree to which the plurality of expert models disagree related to the object/semantic content of each of the designated "key" image frames.

17. The system of claim 15, wherein the structural similarity metric comprises one of a Structural Similarity Index Metric, a scale invariant feature transform (SIFT) metric, a speeded up robust feature (SURF), a histogram of oriented gaussians (HoG), and gradient information with scales and orientation (GIST).

18. The system of claim 15, wherein the plurality of dissimilar expert models comprise a convolutional neural network with variable dropout mask configurations, such that nodes can be randomly removed in successive iterations to obtain variable object detection/region segmentation outcomes from similarly trained expert systems.

19. The system of claim 15, wherein the structural similarity metric of the image frame with respect to the another image frame exceeds the predetermined threshold if the pixel content and position of the image frame and the another image frame is sufficiently similar.

20. The system of claim 15, wherein the plurality of expert models disagree related to the object/semantic content of each of the reduced plurality of image frames if segmentations performed by each of the plurality of dissimilar expert models are sufficiently different.

* * * * *